United States Patent
Kim

(10) Patent No.: US 9,947,144 B2
(45) Date of Patent: Apr. 17, 2018

(54) ERROR VARIANCE DETECTION METHOD OF CAN COMMUNICATION SYSTEM AND THE CAN COMMUNICATION SYSTEM

(71) Applicant: HYUNDAI AUTRON CO., LTD., Seongnam-si (KR)

(72) Inventor: Kyung-Tae Kim, Anyang-si (KR)

(73) Assignee: Hyundai Autron Co., Ltd., Seongnam-si (KR)

( * ) Notice: Subject to any disclaimer, the term of this patent is extended or adjusted under 35 U.S.C. 154(b) by 102 days.

(21) Appl. No.: 14/961,075

(22) Filed: Dec. 7, 2015

(65) Prior Publication Data
US 2016/0163125 A1    Jun. 9, 2016

(30) Foreign Application Priority Data

Dec. 9, 2014    (KR) .................. 10-2014-0175707

(51) Int. Cl.
*G06F 11/00* (2006.01)
*G07C 5/00* (2006.01)
(Continued)

(52) U.S. Cl.
CPC .......... *G07C 5/008* (2013.01); *G06F 11/0739* (2013.01); *G06F 11/3024* (2013.01); *G07C 5/0808* (2013.01); *H04L 12/40032* (2013.01)

(58) Field of Classification Search
CPC ............... G06F 11/3024; G06F 11/202; G06F 11/2005; G06F 11/2041; G06F 11/349; G06F 11/0739
See application file for complete search history.

(56) References Cited

U.S. PATENT DOCUMENTS

| 6,324,658 B1* | 11/2001 | Jasperneite | ............ H04L 43/50 714/43 |
| 2005/0034015 A1* | 2/2005 | Hashimoto | ......... G06F 11/0736 714/18 |

(Continued)

FOREIGN PATENT DOCUMENTS

| CN | 1164710 A | 11/1997 |
| CN | 1848013 A | 10/2006 |

(Continued)

OTHER PUBLICATIONS

German Patent and Management Office, Office Action for German patent application No. 10 2015 121 078.9, Oct. 28, 2016, Germany.

*Primary Examiner* — Yolanda L Wilson
(74) *Attorney, Agent, or Firm* — Baker & McKenzie LLP; Hyunho Park

(57) ABSTRACT

An error variance detection method of CAN communication system according to an exemplary embodiment of the present invention may include storing an error information that corresponds to the communication error in a network management start message, if an communication error is occurred in the CAN communication system, by at least one of a plurality of slave ECU, transferring the network management start message to a master ECU, by at least one of a plurality of slave ECU, determining whether there is or is not the error information in response to the network management start message, by the master ECU, detecting the error information from the network management start message, if there is the error information, by the master ECU, and transmitting the error information detected by a demand of a diagnosis device to the diagnosis device, by the master ECU.

10 Claims, 3 Drawing Sheets

(51) Int. Cl.
  *G06F 11/07* (2006.01)
  *G06F 11/30* (2006.01)
  *G07C 5/08* (2006.01)
  *H04L 12/40* (2006.01)

(56) References Cited

U.S. PATENT DOCUMENTS

| | | | | |
|---|---|---|---|---|
| 2006/0253726 A1* | 11/2006 | Kukshya | ............ | G06F 11/2005 714/4.1 |
| 2008/0186870 A1* | 8/2008 | Butts | ................ | H04L 41/0659 370/252 |
| 2008/0269970 A1* | 10/2008 | Yamada | ............... | B63H 21/213 701/21 |
| 2008/0288137 A1* | 11/2008 | Hatta | .................. | B60R 16/023 701/36 |
| 2009/0183033 A1* | 7/2009 | Ando | ................. | H04L 43/0823 714/43 |
| 2011/0170434 A1* | 7/2011 | Pape | ................ | G05B 19/41855 370/252 |
| 2014/0149801 A1* | 5/2014 | Jiang | .................. | G06F 11/2005 714/43 |
| 2015/0312123 A1* | 10/2015 | Zhang | ................ | G06F 11/0745 709/224 |
| 2016/0163125 A1* | 6/2016 | Kim | ...................... | G07C 5/008 701/31.4 |
| 2016/0217023 A1* | 7/2016 | Wada | ...................... | G06F 13/00 |

FOREIGN PATENT DOCUMENTS

| | | |
|---|---|---|
| CN | 1872592 A | 12/2006 |
| CN | 101483544 A | 7/2009 |
| DE | 197 52 792 A1 | 6/1999 |
| KR | 101241945 B1 | 3/2013 |
| KR | 101297024 B1 | 8/2013 |
| WO | 2014/005914 A1 | 1/2014 |
| WO | 2014039031 A1 | 3/2014 |

* cited by examiner

ERROR VARIANCE DETECTION METHOD OF CAN COMMUNICATION SYSTEM AND THE CAN COMMUNICATION SYSTEM

CROSS-REFERENCE TO RELATED APPLICATION

This application claims priority to and the benefit of Korean Patent Application No. 10-2014-0175707 filed in the Korean Intellectual Property Office on Dec. 9, 2014, the entire contents of which are incorporated herein by reference.

BACKGROUND

1. Field of the Invention

The present invention related to an error variance detection method of CAN communication system and a CAN communication system.

2. Description of the Related Art

Recently, various electric control apparatus (ECU) are combined with a vehicle. The electric control apparatus are connected to one common network bus that includes one or two wires those are disposed along a vehicle body and is a type that connects desk top PCs of an office such that wiring thereof and production cost are dramatically reduced in a vehicle. This network is called a CAN controller area Network.

The electric control apparatus that are used in a CAN communication are connected to one common network bus and each control apparatus uses a CAN controller included in the electric control apparatus to receive and transmit independent control information such that it can optimally maintain the condition of the vehicle. Also, the electric control apparatus re-transmit or ignores the received signal, if a bit error or a form error is generated from a message about the received/transmitted control information. Therein, the error can be generated when the reception and the transmission of the message is not performed by a failure of a CAN controller or a short circuit/a disconnection of a CAN communication line, and the error or the failure can be called "CAN communication error". In this configuration, a conventional diagnosis device is connected to a Can bus line and monitors a CAN message or an error frame that is transmitted or received between electric control apparatus those are connected to a CAN bus so as to detect a CAN failure or error.

However, when a CAN communication error is generated during the reception/transmission between electric control apparatus, a CAN controller and a CAN controller that detects the failure or error repeatedly transmits an error frame to deteriorate the performance of the network and the CAN communication bus line can become not available. That is, a conventional diagnosis device is difficult to diagnosis a condition of a CAN controller that performs a substantial CAN communication or a condition of software that is related to a CAN communication Due to an inoperative condition of a CAN communication bus line, when a CAN communication error is generated.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an error variance detection method and device having advantages of being able to detect a failure of a controller included in ECU or a disconnection or a short circuit of a CAN communication line by using a network management start message, as it is, that is used in ECU of a vehicle.

The objects of the present invention is not limited to the said objects, another objects and merits of the present invention that is not said can be understand by below description, and these can be more clearly understood by an exemplary embodiment of the present invention. Also, it can be easily known that the objects and merits of the present invention can be realized by means and a combination thereof described in a patent claim range.

An error variance detection method of CAN communication system according to an exemplary embodiment of the present invention may include storing an error information that corresponds to the communication error in a network management start message, if an communication error is occurred in the CAN communication system, by at least one of a plurality of slave ECU, transferring the network management start message to a master ECU, by at least one of a plurality of slave ECU, determining whether there is or is not the error information in response to the network management start message, by the master ECU, detecting the error information from the network management start message, if there is the error information, by the master ECU, and transmitting the error information detected by a demand of a diagnosis device to the diagnosis device, by the master ECU.

Also, a CAN communication system that detects a variance of a communication error may include a plurality of slave ECU that is configured to store an error information that corresponds to the communication error in a network management start message, if an communication error is occurred in the CAN communication system, and transfers the network management start message to a master ECU, and a master ECU that is configured to determine whether there is or is not the error information in response to the network management start message, by the master ECU, and is configured to detect the error information from the network management start message, if there is the error information, by the master ECU, and is configured to transmit the error information detected by a demand of a diagnosis device to the diagnosis device.

In accordance with the present invention as describe above, there are effects that a network management start message that is used in ECU of a vehicle is used as it is to be able to detect a failure of a controller included in ECU or a disconnection and a short circuit of a CAN communication line.

DETAILED DESCRIPTION OF THE EMBODIMENTS

Figure 1:
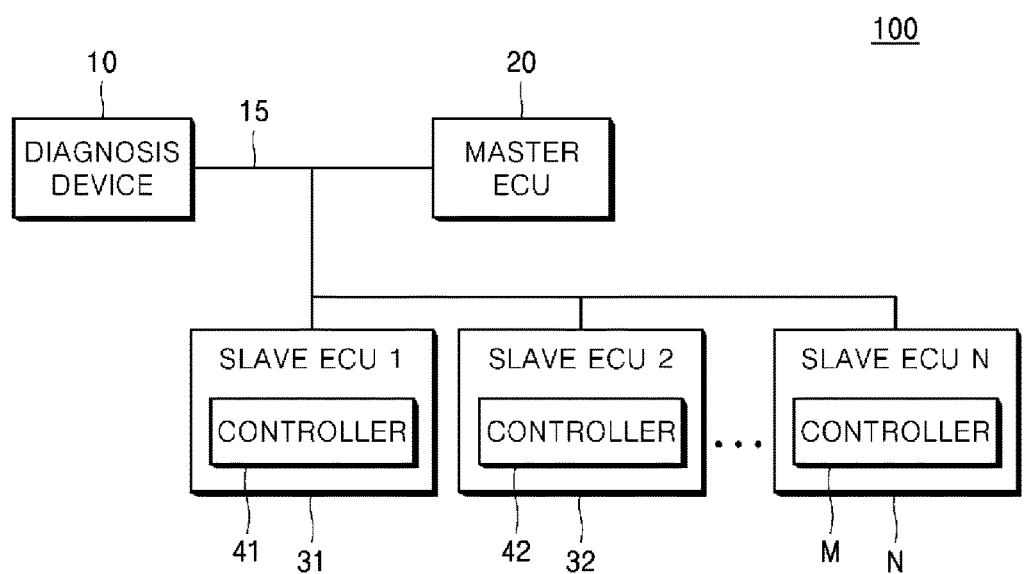
FIG. 1 is a schematic diagram of a CAN communication system according to an exemplary embodiment of the present invention.

The said objects, characteristics, and merits will be described with reference to the attached drawings, and such that those skilled in the art can easily realize the invention.

In describing the present invention, a detailed description of known functions or constructions related to the present invention will be omitted if it is deemed that they would make the gist of the present invention unnecessarily vague. Hereinafter, an exemplary embodiment will be described according to the present invention with reference to the drawings, the present invention.

Like reference numerals designate like or similar elements throughout the specification and the drawings.

FIG. 1 is a schematic diagram of a CAN communication system according to an exemplary embodiment of the present invention.

Referring to FIG. 1, a CAN communication system 100 includes a diagnosis device 10, a master ECU 20, and a plurality of slave ECU 31-N, and the diagnosis device 10, the master ECU 20, the plurality of slave ECU 31-N respectively can transmit and receive error information through a CAN communication line 15.

At this time, a CAN communication system 100 can determine a master ECU 20 and a plurality of slave ECU 31-N based on a node identifier value. Here, the node identifier value can be an intrinsic number that a plurality of ECU have in a vehicle. More specifically, a CAN communication system 100 determines an ECU having smallest node identifier value as a master ECU 20 and can determine a plurality of ECU having a larger value than the smallest node identifier value as a plurality of slave ECU 31-N.

A diagnosis device 10 of FIG. 1 can receive error information that a master ECU 20 and a plurality of slave ECU 31-N responses, because a demand message for diagnosing a communication error that is generated from a CAN communication system 100 is transmitted to a master ECU 20 and a plurality of slave ECU 31-N through a CAN communication line 15. Here, a communication error can include at least one of a failure of a controller 41-M included in a plurality of slave ECU 31-N, and a disconnection or a short circuit of a CAN communication line 15 connecting a plurality of slave ECU 31-N and a master ECU 20. According to an exemplary embodiment, a diagnosis device 10 can transmit a demand message respectively to a master ECU 20 and a plurality of slave ECU 31-N through a CAN communication line 15 in accordance with each node identifier value. According to another exemplary embodiment, a diagnosis device 10 can transmit a demand message to a master ECU 20 and a plurality of slave ECU 31-N through a can communication line 15 in the order of a node identifier value.

Here, a CAN communication line 15 can be a data bus or a data communication line that includes two data line that uses inverted signal which are different from each other.

A plurality of slave ECU 31-N according to an exemplary embodiment of the present invention can diagnosis a communication error through each controller 41-M, if a communication error is generated from a CAN communication system 100. At this moment, each controller 41-M diagnoses a communication error, and can generate and transmit a network management start message based on a diagnosed communication error.

Also, a plurality of slave ECU 31-N can store error information that corresponds to a diagnosed communication error into a network management start message. More specifically, a plurality of slave ECU 31-N stores error information that corresponds to a diagnosed communication error into a storage portion, reads error information from the storage portion, and can store error information into a network management start message.

After this, a plurality of slave ECU 31-N can transmit a generated or a stored network management start message to a master ECU 20 through a CAN communication line 15. That is, if a communication error is generated from a CAN communication system 100, a plurality of slave ECU 31-N reset a plurality of slave ECU 31-N through a controller 41-M included in a plurality of slave ECU 31-N, and a plurality of slave ECU 31-N can transmit a network management start message to a master ECU 20 through a CAN communication line 15.

Accordingly, a master ECU 20 can determine an existence of error information that is transmitted from at least one of a plurality of slave ECU 31-N in response to a network management start message that is transmitted through a CAN communication line 15. More specifically, a master ECU 20 can detect error information from the network management start message, in a case that error information exist in the transmitted network management start message. According to another exemplary embodiment, in a case that error information is not in a transmitted network management start message, a master ECU 20 detects whether there is a communication error of a CAN communication system 100, and can generate error information corresponding to a communication error, if a communication error is detected.

And, a master ECU 20 can transmit detected error information or generated error information to a diagnosis device 10 in accordance with a demand of a diagnosis device 10.

Accordingly, a diagnosis device 10 can receive a communication error that is generated from a CAN communication system 100 that is detected from at least one of a plurality of slave ECU 31-N through a mast ECU 20, based on detected error information and error information that is generated from at least one of a plurality of slave ECU 31-N or a master ECU 20.

Hereinafter, an operation order that detects a variance of a communication error of a CAN communication system 100 will be described with reference to FIG. 2 and FIG. 3. An exemplary operation of one slave ECU 31 of a plurality of slave ECU 31-N will be explained so as to simply explain each operation order of a plurality of slave ECU in the present invention.

Figure 2:
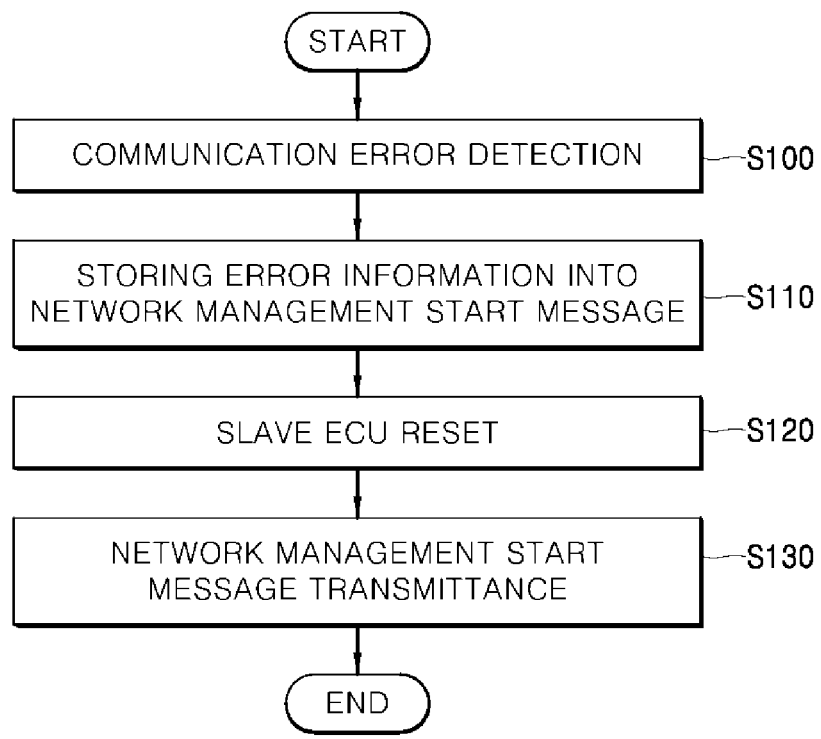
FIG. 2 is a flowchart showing an operation of a slave ECU.

FIG. 2 is a flowchart showing an operation of a slave ECU.

Referring to FIG. 2, a slave ECU 31 detects a communication error S100, if a communication error is generated from a CAN communication system 100. At this moment, a slave ECU 31 reads error information corresponding to a communication error from a controller 41 and stores it in a network management start message S110. Also, the slave ECU 31 resets a slave ECU 31 through a controller 41 S120, if a communication error is generated in a CAN communication system 100. After this, a slave ECU 31 transmits a network management start message to a master ECU 20 through a CAN communication line 15 S130.

After this, a detailed operation of a master ECU 20 will be described in FIG. 3.

Figure 3:
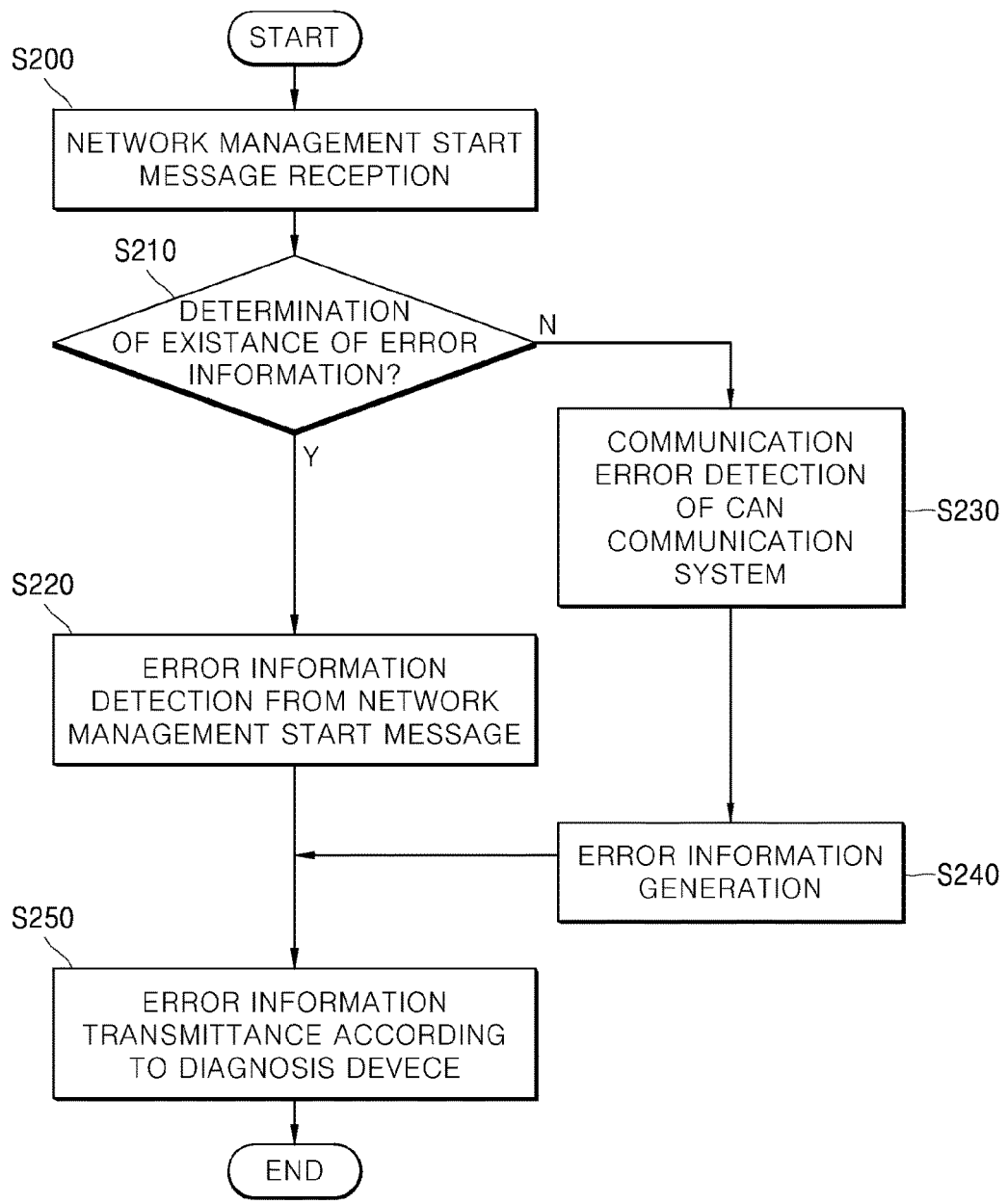
FIG. 3 is a flowchart showing an operation of a master ECU.

FIG. 3 is a flowchart showing an operation of a master ECU.

Referring to FIG. 3, a master ECU 20 receives a network management start message that is transmitted through a CAN communication line 15 from a slave ECU 31 S200. And, a master ECU 20 determines whether there is error information in response to a received network management start message S210. At this moment, a master ECU 20 detects error information in a network management start message S220, in a case that there is error information in a network management start message that is received from a slave ECU 31. In accordance with another exemplary embodiment, in a case that there is not error information in a network management start message that is received from a slave ECU 31, a master ECU 20 detects whether communication error of a CAN communication system 100 is generated S230, and if a communication error is detected, a master ECU 20 generates error information corresponding to communication error S240. After this, a master ECU 20 transmits detected or generated error information to a diagnosis device 10 in accordance with a demand of a diagnosis device 10 S250. According to exemplary embodiment, a master ECU 20 stores detected error information and afterward can transmit stored error information to a diagnosis device 10 according to a demand of a diagnosis device 10.

According to the present invention, ECU in a vehicle is configured by a master ECU and a slave ECU and a network management start message that is used in ECU of a vehicle is used at it is, error information is distributed and is able to be monitored, and thus it is not necessary to replace or to add a separate device for detecting a CAN communication error.

Also, according to the present invention, a network management start message that is used in ECU of a vehicle is used as it is such that a failure of a controller included in ECU or a disconnection and a short circuit of a CAN communication line can be determined.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An error variance detection method of Controller Area Network (CAN) communication system, comprising:
    storing error information that corresponds to a communication error in a network management start message, if the communication error occurs in the CAN Communication system, by at least one of a plurality of slave Electronic Control Units (ECUs);
    transferring the network management start message to a master ECU, by at least one of a plurality of slave ECUs;
    determining whether there is the error information in response to the network management start message, by the master ECU;
    detecting the error information from the network management start message, if there is the error information, by the master ECU; and
    transmitting the error information detected by a demand of a diagnosis device to the diagnosis device, by the master ECU.

2. The error variance detection method of claim 1, comprising: determining the master ECU and the plurality of slave ECUs from a plurality of ECUs of a vehicle based on a node identifier value, wherein the node identifier value is an intrinsic number that the master ECU and the plurality of slave ECUs have.

3. The error variance detection method of claim 1, further comprising:
    detecting whether there is a communication error of the CAN communication system, if there is not the error information, and
    generating the error information corresponding to the communication error, if the communication error is detected, by the master ECU.

4. The error variance detection method of claim 1, further comprising resetting the plurality of slave ECUs through a controller included in the plurality of slave ECUs, by the plurality of slave ECUs, if a communication error is generated from the CAN communication system.

5. The error variance detection method of claim 1, wherein the communication error includes at least one of a malfunction of a controller included in the plurality of slave ECUs, and a disconnection or a short-circuit of a communication line that connects the plurality of slave ECUs and the master ECU.

6. A Controller Area Network (CAN) communication system that detects a variance of a communication error, comprising:
    a plurality of slave Electric Control Units (ECUs) that is configured to store error information that corresponds to the communication error in a network management start message, if a communication error occurs in the CAN communication system, and transfers the network management start message to a master ECU; and
    the master ECU that is configured to determine whether there is the error information in response to the network management start message, by the master ECU, and is configured to detect the error information from the network management start message, if there is the error information, by the master ECU, and is configured to transmit the error information detected by a demand of a diagnosis device to the diagnosis device.

7. A CAN communication system of claim 6, wherein the master ECU and the plurality of slave ECUs are determined from a plurality of ECUs of a vehicle based on a node identifier value, wherein the node identifier value is an intrinsic number that the master ECU and the plurality of slave ECUs have.

8. A CAN communication system of claim 6, wherein the master ECU, detects whether there is a communication error of the CAN communication system, if there is not the error information, and generates the error information corresponding to the communication error, if the communication error is detected.

9. A CAN communication system of claim 6, wherein the plurality of slave ECUs, resets the plurality of slave ECUs through a controller included in the plurality of slave ECUs, if a communication error is generated from the CAN communication system.

10. A CAN communication system of claim 6, wherein the communication error includes at least one of a malfunction of a controller included in the plurality of slave ECUs, and a disconnection or a short-circuit of a communication line that connects the plurality of slave ECUs and the master ECU.

* * * * *